US012768706B2

(12) United States Patent
Zhao et al.

(10) Patent No.: US 12,768,706 B2
(45) Date of Patent: Oct. 20, 2026

(54) GAS CYLINDER WEIGHING TYPE HOB AND GRILL

(71) Applicant: NINGBO AGSUN PRODUCTS, INC., Cixi (CN)

(72) Inventors: Jianfeng Zhao, Cixi (CN); Hao Xu, Cixi (CN); Caihua Sun, Cixi (CN); Xuefei Mao, Cixi (CN); Xianghua Liu, Cixi (CN)

(73) Assignee: NINGBO AGSUN PRODUCTS, INC., Cixi (CN)

( * ) Notice: Subject to any disclaimer, the term of this patent is extended or adjusted under 35 U.S.C. 154(b) by 201 days.

(21) Appl. No.: 18/607,100

(22) Filed: Mar. 15, 2024

(65) Prior Publication Data

US 2024/0219221 A1 Jul. 4, 2024

(30) Foreign Application Priority Data

Jan. 23, 2024 (CN) ......................... 202420167182.0

(51) Int. Cl.
*G01G 21/22* (2006.01)
*G01G 17/04* (2006.01)
*G01G 19/52* (2006.01)

(52) U.S. Cl.
CPC ............. *G01G 21/22* (2013.01); *G01G 17/04* (2013.01); *G01G 19/52* (2013.01)

(58) Field of Classification Search
CPC ......... G01G 21/22; G01G 17/04; G01G 19/52
See application file for complete search history.

(56) References Cited

U.S. PATENT DOCUMENTS 4,779,690 A * 10/1988 Woodman .............. G01G 19/16 177/147
5,337,654 A * 8/1994 Broberg ................ F24C 15/322 99/474
9,504,354 B1 * 11/2016 Ficarra ................ A47J 37/0713
2011/0219958 A1 * 9/2011 Noble .................. A23B 4/0523 99/473
2017/0143162 A1 * 5/2017 Olsen .................. A47J 37/0786
2018/0084945 A1 3/2018 Aoyama
2023/0371746 A1 11/2023 Chung
2025/0383228 A1 * 12/2025 Meyers .................. G01G 17/04

FOREIGN PATENT DOCUMENTS

CN 212738210 U * 3/2021
CN 217358715 U * 9/2022
WO WO-03034003 A1 * 4/2003 ............. G01F 23/20

* cited by examiner

*Primary Examiner* — Peter J Macchiarolo
*Assistant Examiner* — Mireille S Sadate-Moualeu

(57) ABSTRACT

The present invention discloses a gas cylinder weighing type hob, wherein one side of a support carrier is hinged for rotation, and the other side acts on a weight sensor to perform single-side weight detection, the use of only one single weight sensor results in a simpler structure, and a large amount of detection data from the weight sensor may be subject to data fitting to obtain a corresponding equation as a conversion equation of a residual amount of gas in a gas cylinder to detect the residual amount of gas.

10 Claims, 4 Drawing Sheets

A

GAS CYLINDER WEIGHING TYPE HOB AND GRILL

TECHNICAL FIELD

The present invention belongs to the field of grills, and specifically pertains to a gas cylinder weighing type hob and grill.

BACKGROUND

Gas grills are one of common barbecue grills, and reference may be made to Chinese Utility Model Patent No. CN201721154417.9 which discloses grill, wherein a limiting hole is used to place a gas cylinder in a limiting manner so as to place the gas cylinder on a trolley rack, and then the gas cylinder can be connected to a gas grill unit by a gas pipe to provide gas to the gas grill unit which may be a gas stove.

Furthermore, gas in the gas cylinder gradually decreases with use, and to prevent sudden exhaustion of gas which results in failure to be grilled, a weighing device is usually provided, and reference may be made to a weighing alarm system for a gas cylinder for a grill disclosed in Chinese utility model patent No. CN201120427106.1, wherein a base table top is provided to support a gas pipe, and multiple weight sensors are circumferentially provided below the base table top, so that a residual amount of gas in the gas cylinder is detected through compression deformation of each weight sensor.

The above structure has disadvantages in that a combination of multiple weight sensors is required to detect weight of the gas cylinder, there are too many sensors, and damage to any of the sensors will cause detection errors.

SUMMARY

In view of the disadvantages of the prior art, the object of the present invention is to provide a gas cylinder weighing type hob, wherein one side of a support carrier is hinged for rotation, and the other side acts on a weight sensor to perform single-side weight detection, the use of only one single weight sensor results in a simpler structure, and a large amount of detection data from the weight sensor may be subject to data fitting to obtain a corresponding equation as a conversion equation of a residual amount of gas in a gas cylinder to detect the residual amount of gas.

In order to achieve the above object, the present invention provides the following technical solutions: the gas cylinder weighing type hob comprises a hob body and a support carrier mounted on the hob body; the support carrier is hinged on one side thereof to the hob body by at least one hinging position and is supported on an opposite side by a weighing position, and a weight sensor is provided at the weighing position, so that the support carrier is supported on the hob body.

The present invention is further arranged such that two hinging positions are provided, the two hinging positions are adjacent to one side edge of the support carrier, the weight sensor is located at an opposite side edge, and the hinging positions are at a height close to the weight sensor, so that the support carrier is horizontally arranged.

By adopting the above technical solutions, 1. the gas cylinder is placed in the placing position to enable mounting on the support carrier and being supported by the support carrier, and simultaneously pressing down the support carrier; 2. a rear end of the support carrier is mounted rotatably to the hob body by the hinging positions to support the rear end, a front end of the support carrier is pressed against the weight sensor by the weighing position to support the front end, and the front end and the rear end respectively support the support carrier to ensure support stability; 3. the weight sensor is subject to a pressure from the weighing position to generate a deformation signal, in case of being pressure sensitive, the deformation signal is transmitted to a central control system as an independent variable, the central control system outputs through a conversion formula to detect the gas in the gas cylinder, and dependent variables may be a residual volume and weight of the gas in the gas cylinder; and 4. the detection is performed by a single overturning weight sensor, which results in a simpler structure, and avoids influence on measurement results due to damage of some of weight sensors.

The present invention also provides a grill which comprises the gas cylinder weighing type hob described above, a grill body and a gas device; the gas device and the grill body are arranged above the hob body; and the gas device is configured to burn gas to heat an inside of the grill body.

REFERENCE NUMERALS

Figure 1:
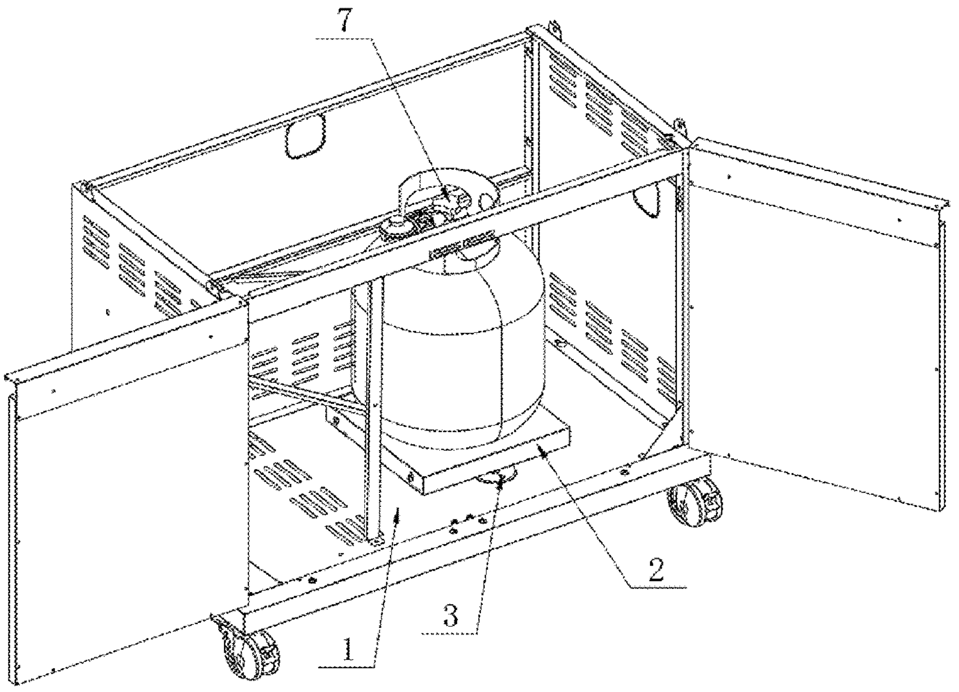
FIG. 1 is an assembly diagram of Embodiment I of the present invention with a gas cylinder loaded.
Figure 2:
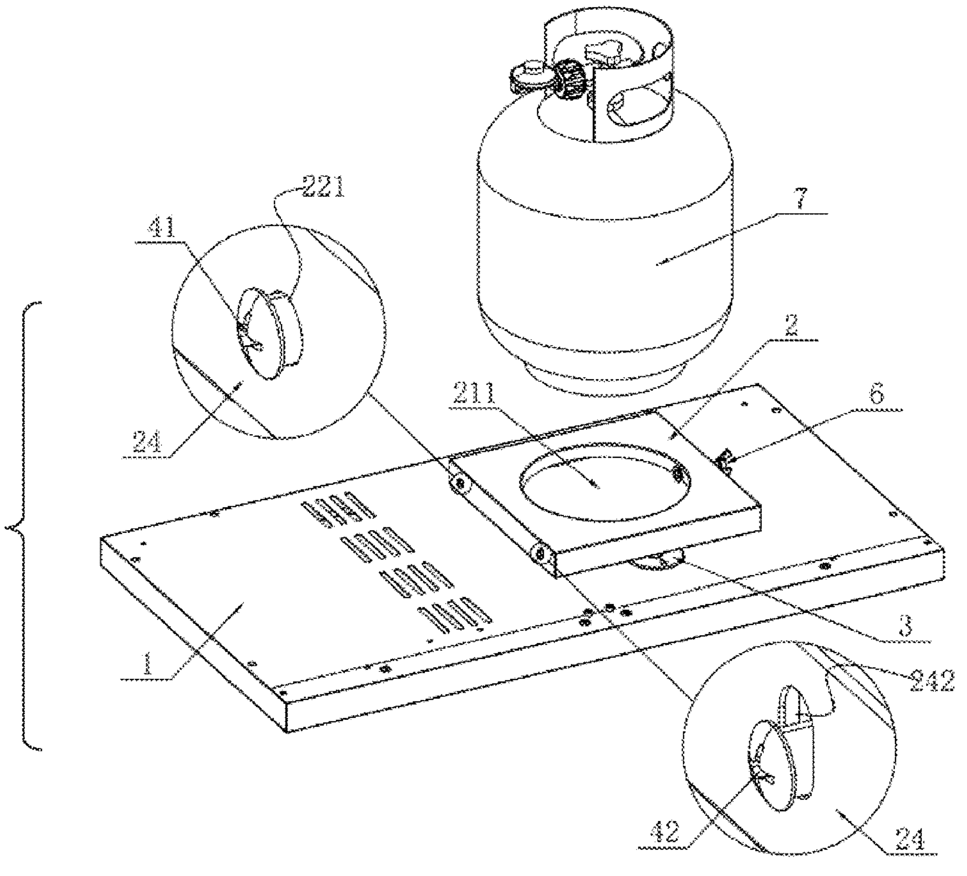
FIG. 2 is a schematic diagram of part of mechanisms and the gas cylinder according to Embodiment I of the present invention.
Figure 3:
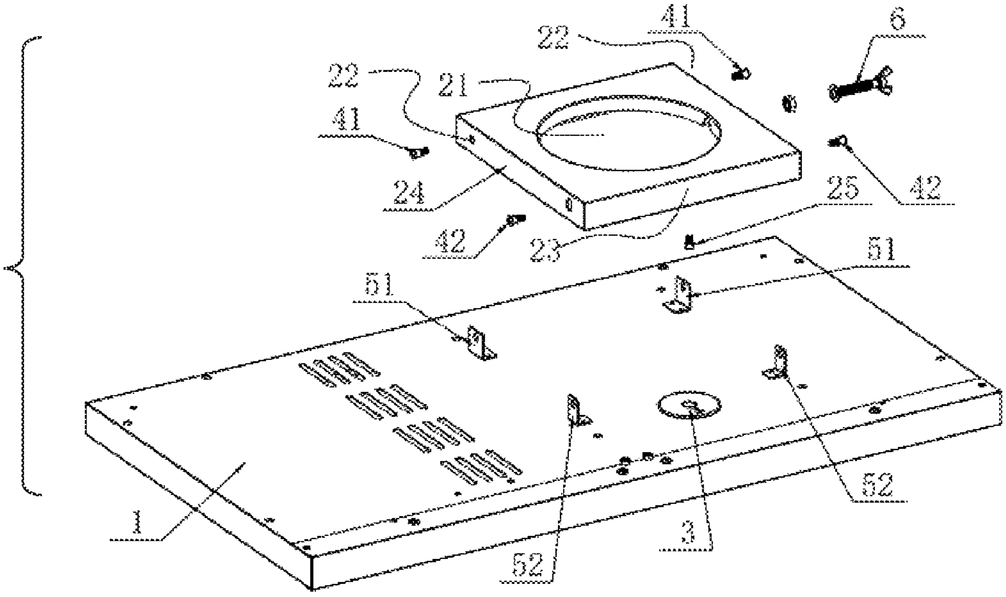
FIG. 3 is an exploded view of part of the mechanisms according to Embodiment I of the present invention.
Figure 4:
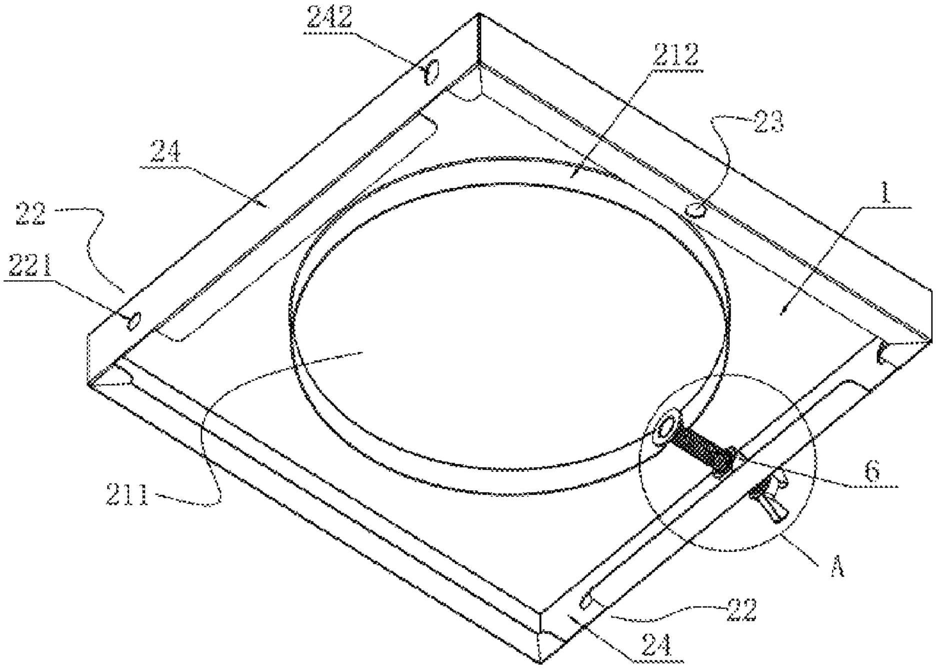
FIG. 4 is a view showing cooperation between a support carrier and a screwing member according to Embodiment I of the present invention.
Figure 5:
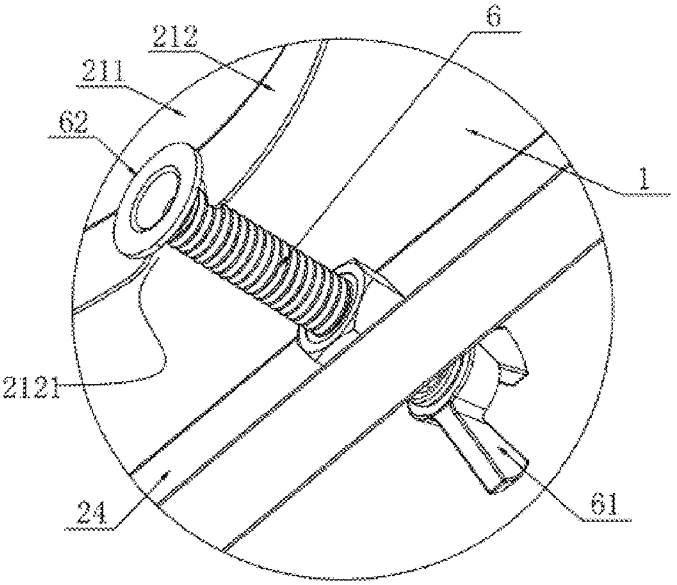
FIG. 5 is an enlarged view of A in FIG. 4.
Figure 6:
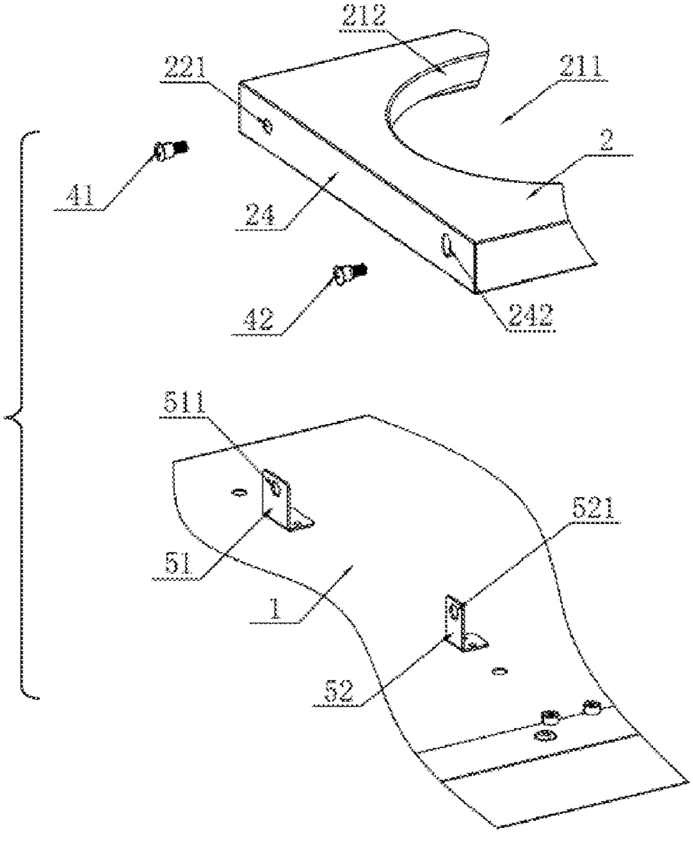
FIG. 6 is an enlarged view of a portion of FIG. 3.

1. hob body;
2. support carrier;
21. placing position; 22. hinging position; 23. weighing position; 24. mounting side plate; 25. top member;
211. limiting circular hole; 212. limiting ring wall; 221. first through hole; 242, travel hole;
2121. extending port;
3. weight sensor;
41. rotating member; 42. limiting member;
51. rotary mounting seat; 52. travel mounting seat;
511. second through hole; 521. third through hole;
6. screwing member;
61. driving head; 62, locking end; and
7. gas cylinder.

DESCRIPTION OF THE EMBODIMENTS

Embodiment I

As shown in FIGS. 1-7, the present invention discloses a gas cylinder weighing type hob which comprises a hob body 1, a support carrier 2 and a weight sensor 3;

Here, the weight sensor 3 is fixed to a bottom plate of the hob body 1 in a snap-fit manner;

Here, the support carrier 2 is provided with a placing position 21 located in the middle, a hinging position 22 located on a rear side and a weighing position 23 located on a front side, the placing position 21 is configured to place a gas cylinder 7 on the support carrier 2, the hinging position 22 is mounted rotatably to the hob body 1, and an axial direction of relative rotation is in a left-right direction to realize that the support carrier 2 is vertically overturnable relative to the hob body 1; and the weighing position 23 is located above the weight sensor 3, and the weighing position 23 acts downwards on the weight sensor 3; and Here, the weight sensor 3 is configured to detect a downward force exerted by the weighing position 23 on the weight sensor 3.

Therefore, 1. the gas cylinder 7 is placed in the placing position 21 to enable mounting on the support carrier 2 and being supported by the support carrier 2, and simultaneously pressing down the support carrier 2; 2. a rear end of the support carrier 2 is mounted rotatably to the hob body 1 by the hinging position 22 to support the rear end, a front end of the support carrier 2 is pressed against the weight sensor 3 by the weighing position 23 to support the front end, and the front end and the rear end respectively support the support carrier 2 to ensure support stability; 3. the weight sensor 3 is subject to a pressure from the weighing position 23 to generate a deformation signal y, the deformation signal is transmitted to a central control system as an independent variable, the central control system outputs a dependent variable x through conversion by a conversion formula, x may be a residual volume of gas in the gas cylinder 7, an overall weight of the gas cylinder 7 and the like, thus detecting the gas in the gas cylinder 7; and 4. the detection is performed by the single overturning weight sensor 3, which results in a simpler structure, and avoids influence on measurement results due to damage of some of weight sensors 3.

In addition, the weight sensor 3 is connected to an AD conversion chip in order to convert the signal generated by the weight sensor 3 into a desired output signal. The conversion formula in the present embodiment is $x=y/a+b$, where a is a deformation coefficient, b is an initial deformation value, y is an independent variable, x is a dependent variable, y is the deformation signal generated by the weight sensor 3, and x is the signal output by the AD conversion chip, and may be the residual volume of the gas in the gas cylinder 7, the overall weight of the gas cylinder 7, a weight of the gas in the gas cylinder 7 and the like, and a and b are constants.

Figure 7:
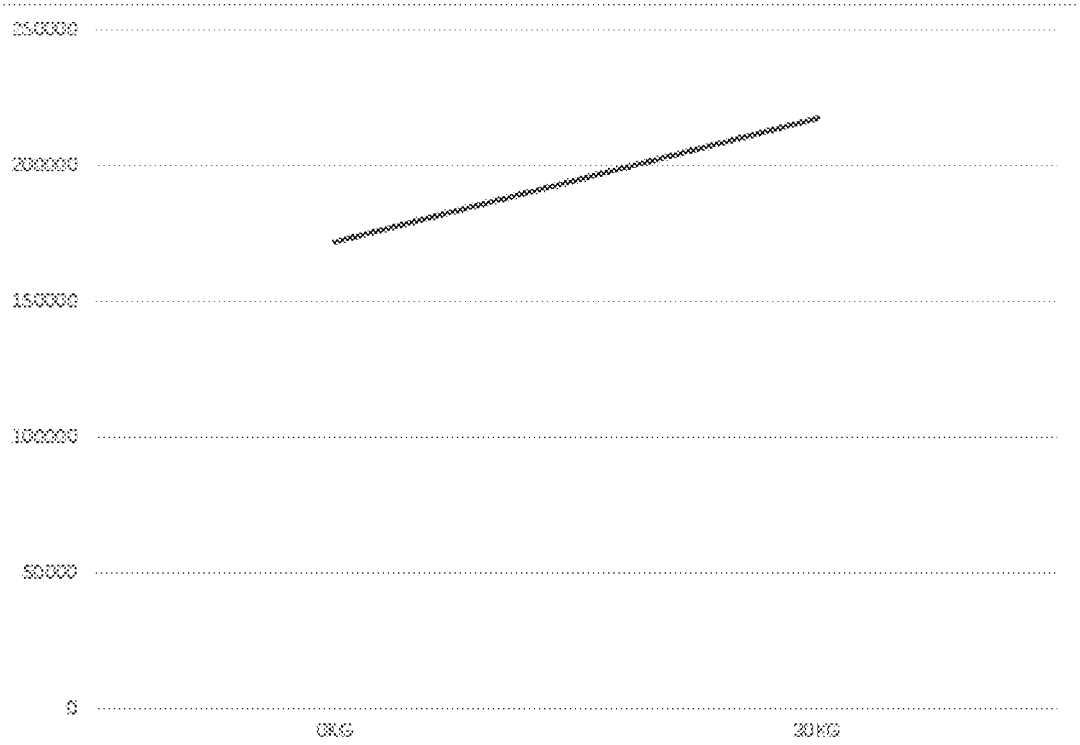
FIG. 7 is a schematic diagram of a conversion formula in Embodiment I of the present invention.

As shown in FIG. 7, when x is the overall weight of the gas cylinder 7, a large number of data tests may be performed at an equipment commissioning stage, and the system may perform detection for automatic fitting according to the deformation signal from the weight sensor 3 and an actually tested gravity, and values of a and b may also be calculated manually for use.

Here, the weight sensor 3 maybe BWG601 weight sensor produced by Zhongshan Boerwen Sensor Technology Co., Ltd, and the AD conversion chip may be HX711 chip produced by Avia Semiconductor (Xiamen) Ltd.

In addition, a display screen may be provided so that the signal x output by the AD conversion chip is displayed.

Here, the support carrier 2 is provided with a top member 25 at the weighing position 23, so that the top member 25 presses down against the weight sensor 3. Specifically, the top member 25 maybe a bolt, latch or the like.

Here, since the placing position 21 is located between the hinging position 22 and the weighing position 23, acting forces generated by the weighing position 23 and the hinging position 22 are in a same downward direction, thus working together to support the gas cylinder 7, achieving a smaller acting force and more stable support, and preventing rollover of the support carrier 2.

Furthermore, a travel assembly is provided between the support carrier 2 and the hob body 1 in the present embodiment, so that a travel of the support carrier 2 to be overturned upward or downward relative to the hob body 1 is limited by the travel assembly, thus preventing outflow of the gas cylinder 7 due to excessive overturn, collision with the hob body 1, excessive squeezing of the weight sensor 3 and the like.

Specifically, the travel assembly in the present embodiment comprises a travel guide rail and a limiting member 42; the limiting member 42 is snap-fitted into the travel guide rail to be limited by both ends of a track of the travel guide rail to restrict a rotational travel of the support carrier 2 relative to the hob body 1.

Preferably, in the present embodiment, an upper portion of the support carrier 2 is a square plate body, elongated plate bodies extending downwards are respectively provided around the square plate body, and a lower portion of the elongated plate body is bent inward to form a folded plate below, resulting in a sheet metal structure as a whole, further leading to a stable and simple structure and low processing cost.

Here, the elongated plate bodies on the left and right sides in the present embodiment are used as mounting side plates 24. In addition, the bottom plate of the hob body 1 is provided with a rotary mounting seat 51 corresponding to each of the mounting side plates 24 by means of welding, a bolt and the like, and the rotary mounting seat may be an L-shaped stamped member; and the hinging position 22 is provided with a first through hole 221 penetrating left and right on each of the mounting side plates 24, and each of the rotary mounting seats 51 is provided with a second through hole 511 penetrating left and right. Furthermore, a rotating member 41 is provided between each of the first through hole 221 and each of the second through hole 511, so that the mounting side plates 24 and the rotary mounting seats 51 are mounted rotatably to each other under the cooperation of the rotating member 41 with the first through hole 221 and the second through hole 511.

Here, the rotating member 41 maybe a rivet, a plunger or the like.

Specifically, the rotating member 41 in the present embodiment is a step bolt, and a nut may be used for matching, and one of the first through hole 221 and the second through hole 511 may be arranged as a threaded hole.

Preferably, the bottom plate of the hob body 1 in the present embodiment is provided with a travel mounting seat 52 corresponding to each of the mounting side plates 24 by means of welding and a bolt, and the travel mounting seat may be an L-shaped stamped member; the travel guide comprises a travel hole 242 penetrating left and right provided on each of mounting side plates 24, each of the travel mount 52 is provided with a third through hole 521 penetrating left and right, correspondingly 2 limiting members 42 are arranged, and each of the limiting member 42 penetrates the corresponding travel hole 242 and the third through hole 521 respectively; and each of the travel holes 242 is a vertically extending elongated hole.

Therefore, 1. the limiting member 42 is inserted into the third through hole 521 to position the limiting member 42 relative to the travel mounting seat 52, and the limiting member 42 is inserted into the travel hole 242, so that the two cooperate with each other to limit an overturning travel of the support carrier 2 relative to the hob body 1, resulting in a simpler structure; and 2. since the weight sensor 3 has a deformation range, that is, an actual overturning angle of the support carrier 2 relative to the hob body 1 is small, the vertically arranged travel hole 242 results in a simpler structure and more convenient arrangement.

Here, the limiting member 42 maybe a plunger or the like.

Specifically, the limiting member 42 in the present embodiment is a step bolt, and a nut may be used for matching, and the third through hole 521 may be arranged as a threaded hole.

It should be noted that, in order to make the detection structure more accurate, a cross-sectional width or diameter of the limiting member 42 maybe set to be smaller than a width of the travel hole 242 to prevent contact between the support carrier 2 and the hob body 1 during overturning of the support carrier relative to the hob body.

Furthermore, the placing position 21 in the present embodiment is provided with a limiting circular hole 211 penetrating downward and a limiting ring wall 212 surrounding below the limiting circular hole 211.

Therefore, the limiting circular hole 211 may be adapted to a ring portion at a lower end of the gas cylinder 7, so that the ring portion of the gas cylinder 7 is placed in the limiting circular hole 211 to perform radial limiting, and the limiting ring wall 212 further cooperates with the ring portion of the gas cylinder 7, so that the radial limiting is accompanied by overturning limiting, so that the gas cylinder 7 is more stable.

Furthermore, a screwing member 6 is thread-fitted on a right side of the support carrier 2 in the present embodiment; wherein a driving head 61 is provided on a right side of the screwing member 6 on an outer periphery of the support carrier 2, and may be butterfly-shaped, so that the screwing member 6 is rotationally driven by the driving head 61; and wherein a right side of the limiting ring wall 212 is penetratingly provided with an extending port 2121 through which the support carrier 2 passes, and the screwing member 6 is provided with a locking end 62 on an inner periphery of the limiting ring wall 212.

Therefore, after the ring portion of the gas cylinder 7 is placed in the limiting ring wall 212, the screwing member 6 is driven to press the locking end 62 against the ring portion of the gas cylinder 7 for locking to ensure mounting stability of the gas cylinder 7.

Specifically, a nut is welded to the mounting side plate 24 on the right side of the support carrier 2 for thread fit of the screwing member 6.

Embodiment II

A gas cylinder weighing type hob has a main structure the same as Embodiment I, except that:

The hinging position 22 and the weighing position 23 are adjacently provided on both sides of the placing position 21; or The hinging position 22 and the weighing position 23 are located on a same side of the placing position 21, and the weighing position 23 is located between the hinging position 22 and the placing position 21.

Embodiment III

A gas cylinder weighing type hob has a main structure the same as Embodiment I, except that each of the travel holes 242 is an arc-shaped hole with the corresponding first through hole 221 as a center, so that the travel hole may be adapted to a limiting member 42 with a larger cross-sectional width or diameter, allowing the limiting member 42 to have a better strength.

Embodiment IV

A gas cylinder weighing type hob has a main structure the same as Embodiment I, except that a gas cylinder 7 is provided.

Embodiment V

A grill comprises the gas cylinder weighing type hob according to any of Embodiments I to IV, as well as a grill body and a gas device; the gas device and the grill body are arranged above a hob body 1 of the hob; and the gas device is connected with a gas cylinder 7, the gas cylinder 7 supplies gas to the gas device, and the gas device burns gas to heat an inside of the grill body.

The gas device may be a gas stove.

What is claimed is:

1. A gas cylinder weighing type hob, comprising:

a hob body, and a support carrier mounted on the hob body, the support carrier being configured to bear a gas cylinder; and wherein the support carrier is hinged on one side thereof to the hob body by at least one hinging position and is supported on an opposite side by a weighing position; a weight sensor is provided at the weighing position, so that the support carriage is supported on the hob body by the hinging position together with the weight sensor; and the number of the weight sensor is one, and the weight sensor measures and outputs a bearing weight value thereof and outputs a residual amount of gas in the gas cylinder by conversion;

two hinging positions are provided, the two hinging positions are adjacent to one side edge of the support carrier, the weight sensor is located at an opposite side edge, and the hinging positions are at a height close to the weight sensor, so that the support carrier is horizontally arranged; and the hinging positions and the weight sensor are located on a bottom surface of the support carrier, a placing position is provided at an upper surface of the support carrier, and the placing position is arranged for placing the gas cylinder.

2. The gas cylinder weighing type hob according to claim 1, wherein a travel assembly is provided between the support carrier and the hob body, and the travel assembly comprises a travel guide rail and a limiting member; and the travel guide rail and the limiting member cooperate to limit a rotational travel of the support carrier relative to the hob body.

3. The gas cylinder weighing type hob according to claim 2, wherein mounting side plates are respectively provided on two opposite sides of the support carrier, and the hob body is provided with a rotary mounting seat corresponding to each of the mounting side plates; and a first through hole is respectively provided on each of the mounting side plates at the hinging position, a second through hole is respectively provided on each of the rotary mounting seats, and a rotating member is provided between each of the first through hole and each of the second through hole to mount the corresponding mounting side plate and the rotary mounting seat rotatably to each other.

4. The gas cylinder weighing type hob according to claim 3, wherein the hob body is provided with a travel mounting seat corresponding to each of the mounting side plates; and the travel guide rail comprises a travel hole provided on each of the mounting side plates, a third through hole is provided on each of the travel mounting seats, 2 limiting members are arranged, and each of the limiting members penetrates the corresponding travel hole and the third through hole.

5. The gas cylinder weighing type hob according to claim 4, wherein each of the travel holes is a vertically extending elongated hole.

6. The gas cylinder weighing type hob according to claim 4, wherein each of the travel holes is an arc-shaped hole with the corresponding first through hole as a center.

7. The gas cylinder weighing type hob according to claim 4, wherein each of the rotating members and the limiting members is a step bolt, and the residual amount of gas output is a weight or volume of residual gas in the gas cylinder.

8. The gas cylinder weighing type hob according to claim 1, wherein the placing position is provided with a limiting circular hole extending downwardly therethrough and a limiting ring wall surrounding a lower portion of the limiting circular hole.

9. The gas cylinder weighing type hob according to claim 8, wherein a screwing member is threadedly fitted on the support carrier;

the screwing member is provided with a driving head on an outer periphery of the support carrier; and an extending port through which the support carrier passes is provided on the limiting ring wall, and the screwing member is provided with a locking end on an inner periphery of the limiting ring wall.

10. A grill, comprising the gas cylinder weighing type hob according to claim 1, a grill body and a gas device;

the gas device and the grill body are arranged above the hob body; and the gas device is configured to burn gas to heat an inside of the grill body.

* * * * *